Jan. 17, 1933.    R. H. FLUEGGE    1,894,259
MACHINE FOR MAKING WINDOWED RECEPTACLES
Filed June 13, 1932    8 Sheets-Sheet 1

Inventor
Robert H. Fluegge
By Walter M. Fuller
Atty

Jan. 17, 1933.   R. H. FLUEGGE   1,894,259
MACHINE FOR MAKING WINDOWED RECEPTACLES
Filed June 13, 1932   8 Sheets-Sheet 3

Inventor:
Robert H. Fluegge
By Walter M. Fuller atty.

Jan. 17, 1933.  R. H. FLUEGGE  1,894,259
MACHINE FOR MAKING WINDOWED RECEPTACLES
Filed June 13, 1932   8 Sheets-Sheet 4

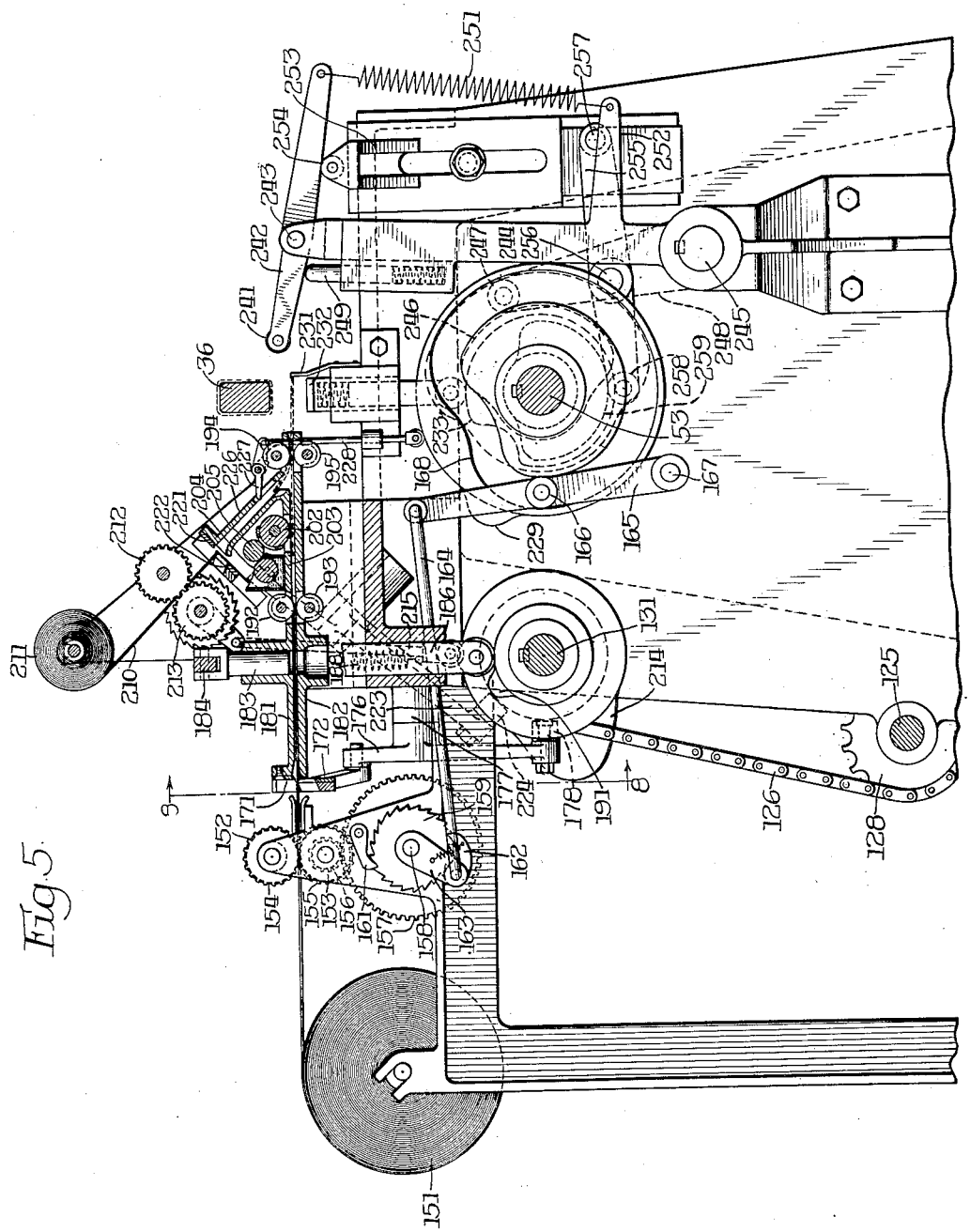

Jan. 17, 1933.  R. H. FLUEGGE  1,894,259
MACHINE FOR MAKING WINDOWED RECEPTACLES
Filed June 13, 1932  8 Sheets-Sheet 6
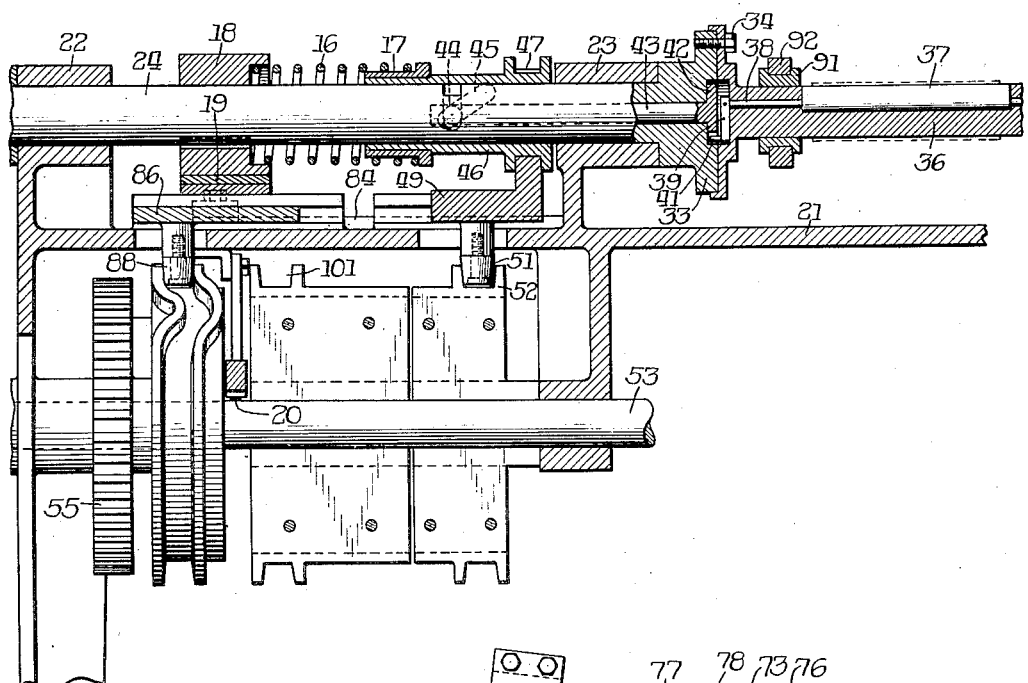
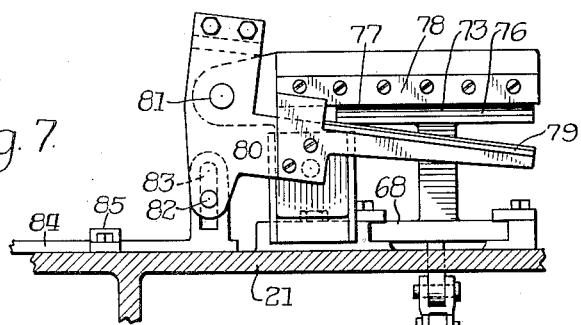
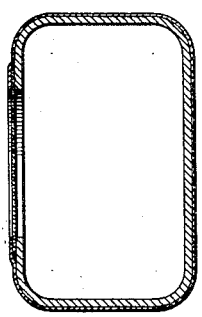
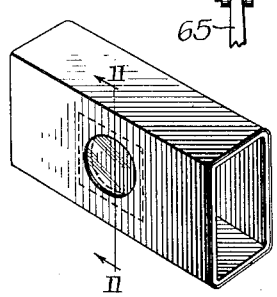
Inventor:
Robert H. Fluegge
By Walter M. Fuller atty.

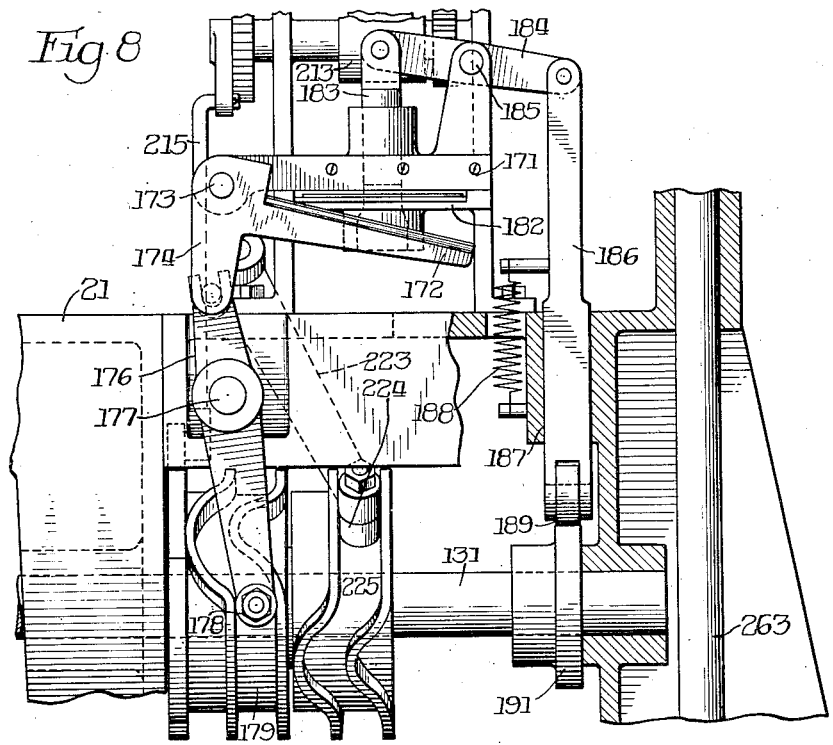
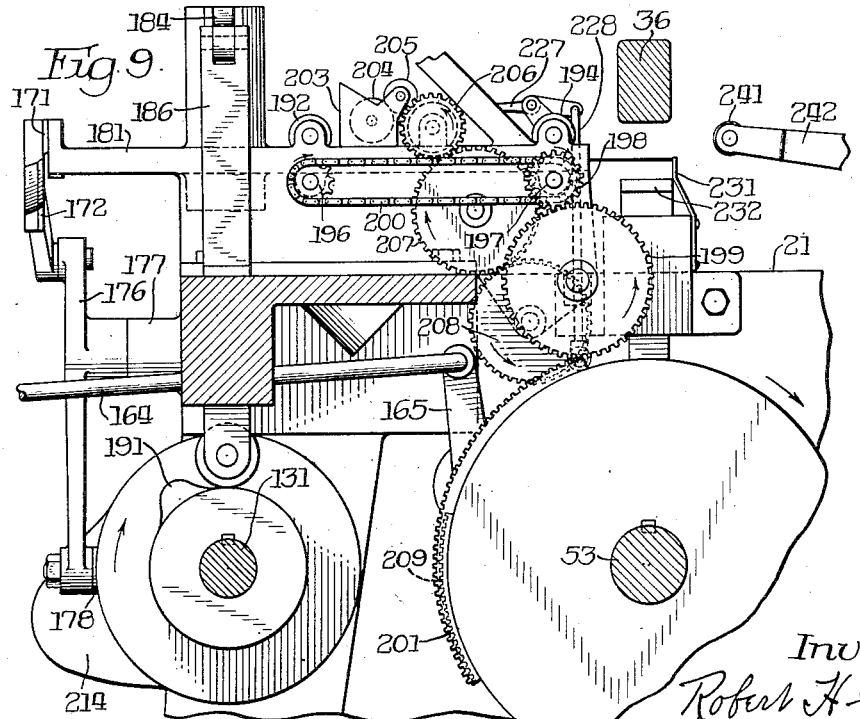

Jan. 17, 1933.  R. H. FLUEGGE  1,894,259
MACHINE FOR MAKING WINDOWED RECEPTACLES
Filed June 13, 1932   8 Sheets-Sheet 8

Inventor:
Robert H. Fluegge
By Walter M. Fuller
Atty.

Patented Jan. 17, 1933

1,894,259

UNITED STATES PATENT OFFICE

ROBERT H. FLUEGGE, OF ELMHURST, ILLINOIS, ASSIGNOR TO W. C. RITCHIE AND COMPANY, OF CHICAGO, ILLINOIS, A CORPORATION OF ILLINOIS

MACHINE FOR MAKING WINDOWED RECEPTACLES

Application filed June 13, 1932. Serial No. 616,802.

My invention relates to mechanisms for producing receptacles for packaged goods having windows covered with transparent material, the principal objects of the invention being to provide a machine of this character which will operate automatically and efficiently and which will provide windowed constructions of satisfactory quality; a further aim of the invention being to supply a mechanism of this type which can be operated at relatively high speed, which is unlikely to become damaged or injured in ordinary service, and which is not subject to material interruptions in the productions of the structures made.

To permit those acquainted with this art to understand the invention fully, in the accompanying drawings, forming a part of this specification, I have illustrated two preferred embodiments of the invention, and, for simplicity, like reference characters have been used throughout the several views to designate the same parts.

In these drawings:—
Figure 1 is a front elevation of one embodiment of the invention;

Figure 5 is a vertical cross-section on line 5—5 of Figure 2;
Figure 6 is a longitudinal, vertical section on line 6—6 of Figure 2;

Figure 7 is a fragmentary, vertical, lengthwise section on line 7—7 of Figure 2;

Figure 8 is an enlarged cross-section on line 8—8 of Figure 5;

Figure 9 is an enlarged cross-section on line 9—9 of Figure 2;

Figure 10 is a perspective view of one of the windowed receptacles produced by the machine;

Figure 11 is an enlarged cross-section on line 11—11 of Figure 10;

Figure 1:
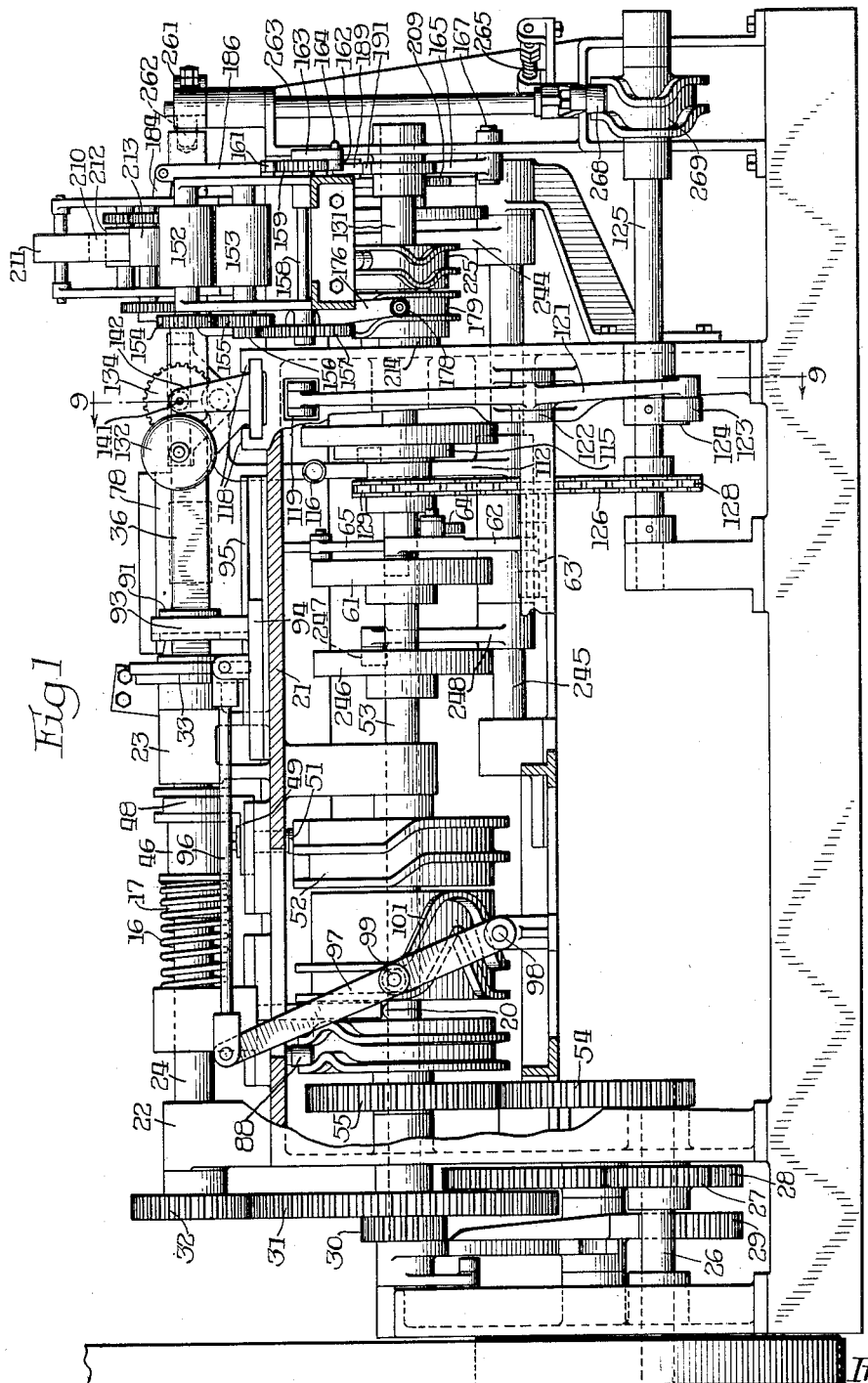
Figure 2:
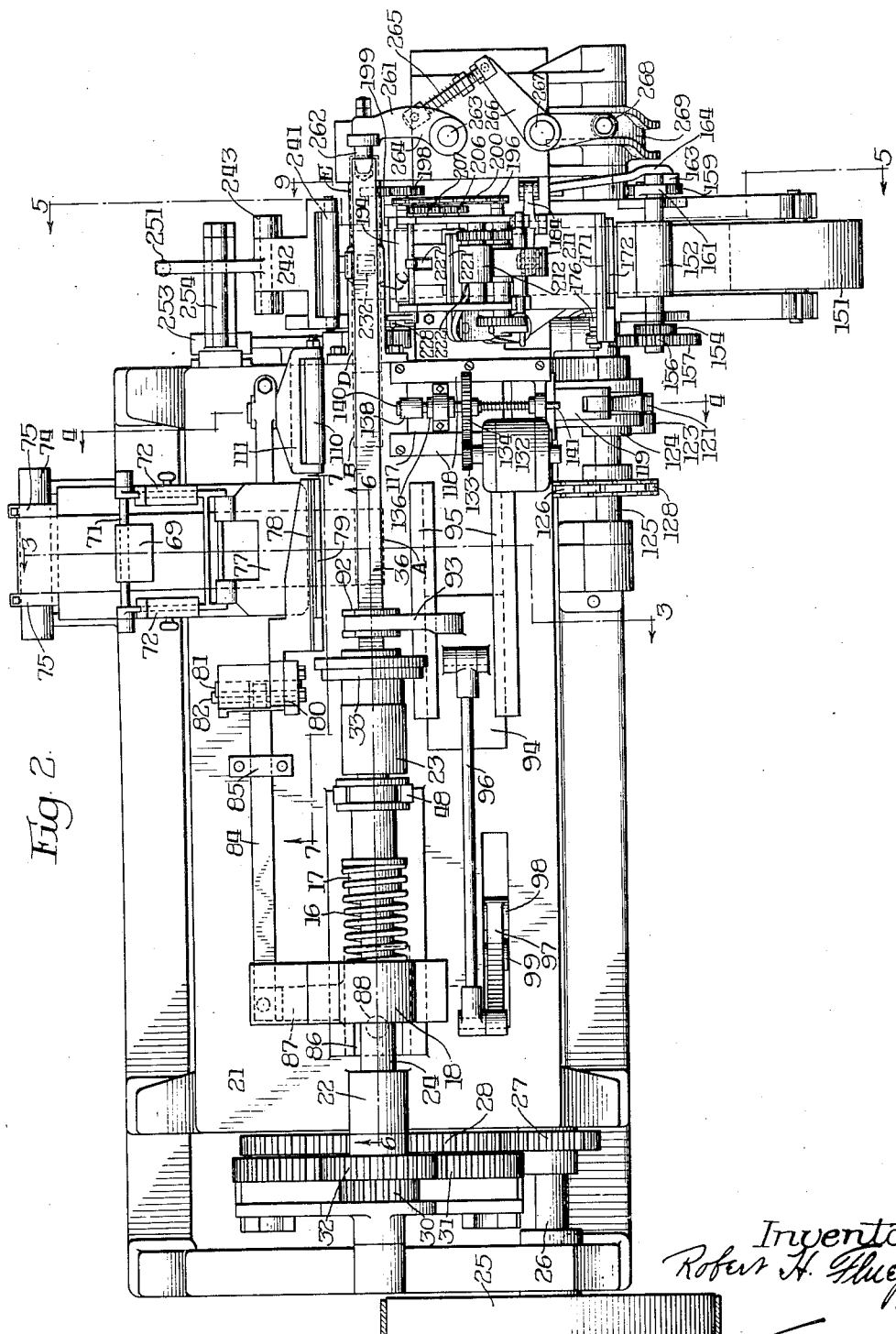
Figure 2 is a plan view of the machine presented in Figure 1.

Referring first to Figures 1, 2, and 6, it will be noted that the frame or table portion of the machine has been designated 21 and on the top of this there are two aligned bearings 22 and 23 accommodating an intermittently-revoluble shaft 24 operated interruptedly from a belt-driven pulley 25 on a shaft 26 and intermeshing gears 27, 28, gear-segment 29, and other gears 30, 31, and 32, in any approved manner to effect the required discontinuous rotation of the shaft. Inasmuch as such mechanisms are well known in the art, no further or detailed description of this portion of the mechanism is seemingly required.

Figure 4:
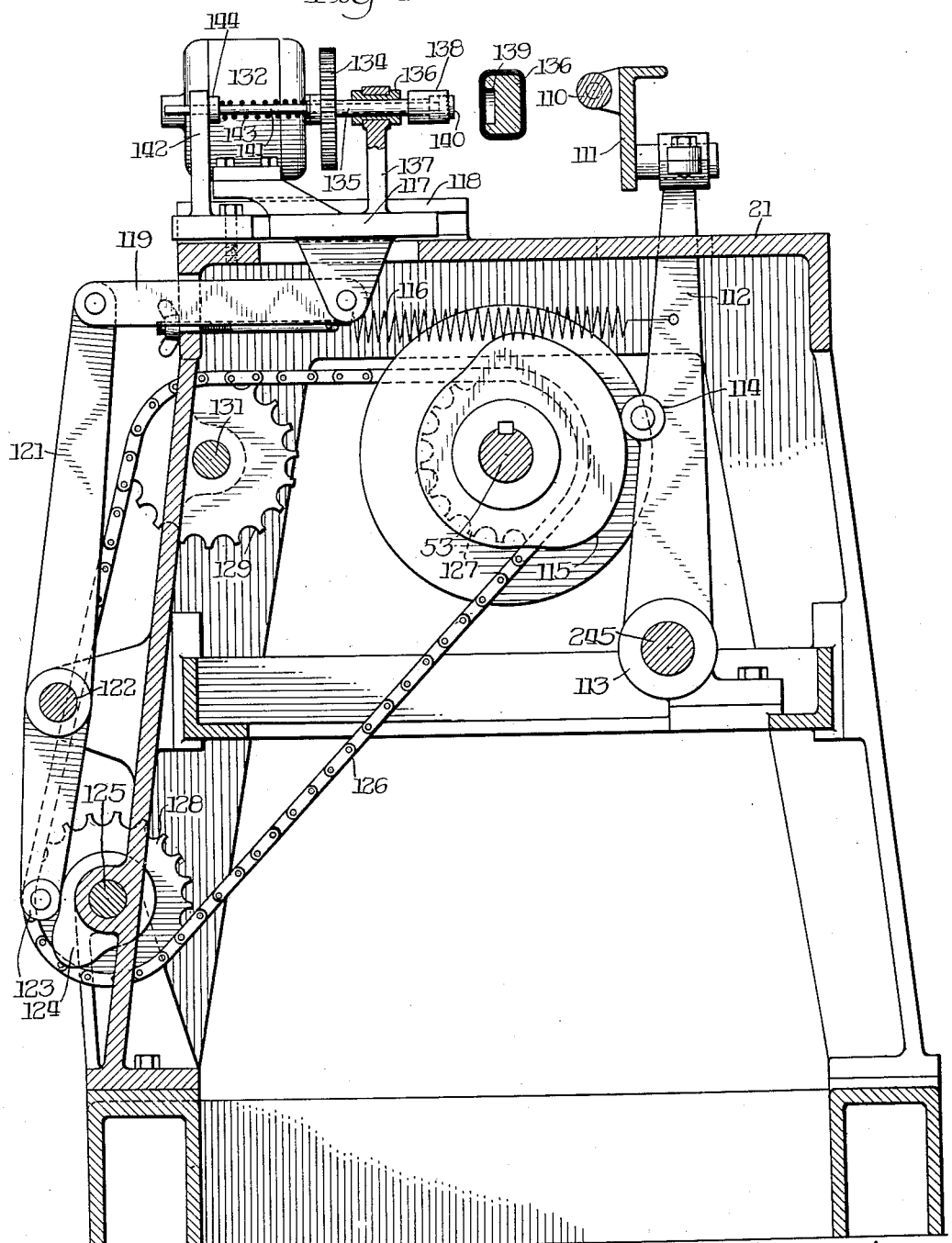
Figure 4 is a vertical cross-section on line 4—4 of Figure 2.

At one end, shaft 24 is enlarged at 33, to which portion, by means of one or more screws 34, is secured the disc end-section 35 of a mandrel 36, which mandrel may be of any desired shape in cross-section, but which, in the present instance, is of rectangular form,— as indicated, for example, in Figures 4 and 5.

Figure 3:
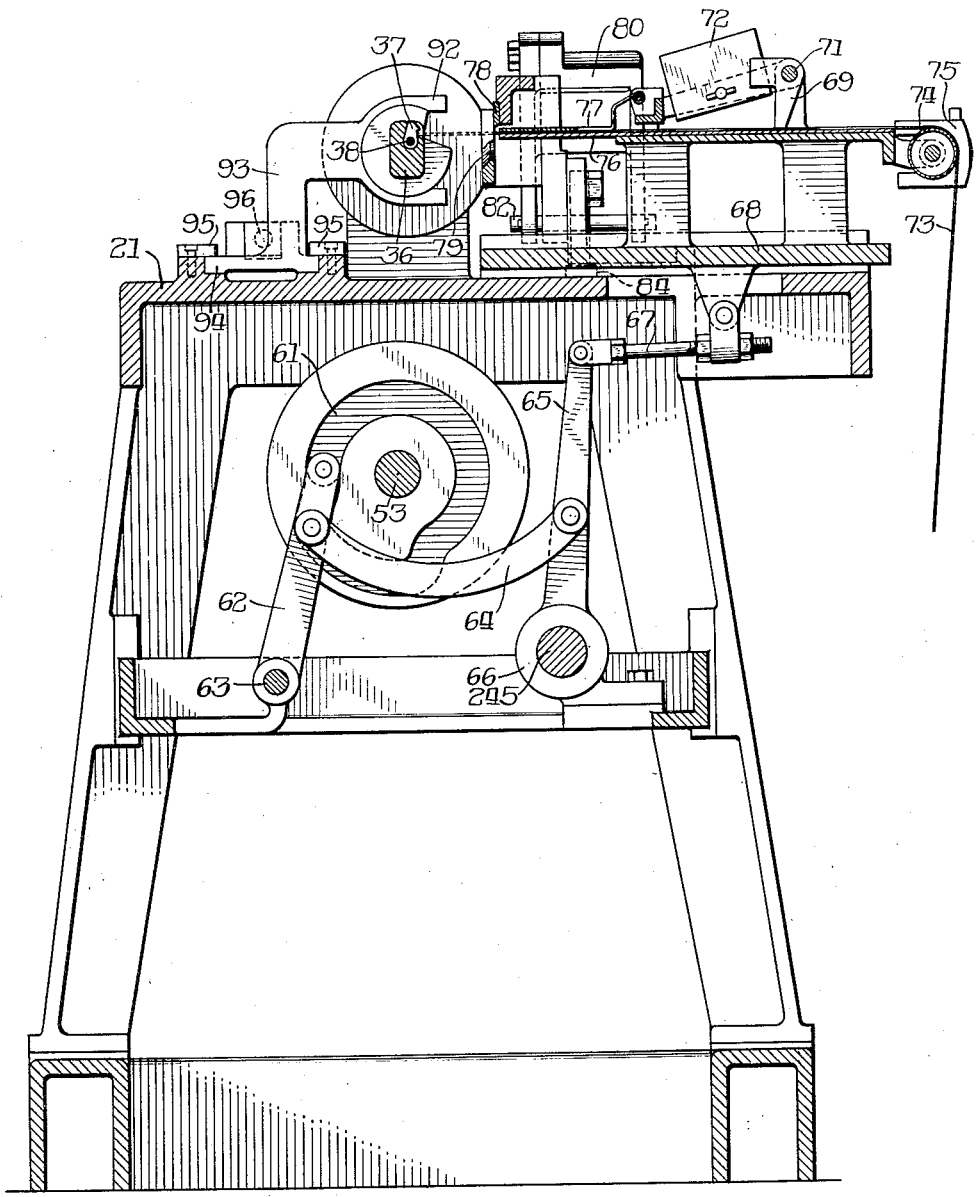
Figure 3 is a vertical cross-section on line 3—3 of Figure 2.

Looking at Figures 3 and 6, it will be noted that a portion of the mandrel 36 is cut away to provide for the accommodation of a rockable clamp or gripper 37 fixed on a rod or shaft 38 oscillatory in suitable bearings in the mandrel, such shaft 38 at one end (Figure 6) having an arm accommodated in a recess in the head 35 and equipped with a pin 41 in a cavity or slot in a head 42 of a shaft 43 oscillatory in a central bearing in the shaft 24.

Near one end, shaft 43 has a lateral, outstanding pin 44 rockable in a cavity in the shaft 24 and extending beyond its surface into an oblique or inclined groove 45 in a sleeve 46 slidable lengthwise on the shaft 24 by means of a yoke 47 fitted in an annular groove in the sleeve and upstanding from a slide 49 guided in suitable ways and equipped with a pin or roller 51 fitting in a groove of a cam 52 on a suitably-journaled shaft 53 beneath the table top and revolved from the drive-shaft by gearing 54, 55.

From what precedes, it will be clear that as the sleeve 46 is slid back and forth on the shaft 24, it will rock the shaft 43 and its arm 42 to correspondingly oscillate the clamp to grip or release the forward end of a pasteboard or cardboard strip to be wound convolutely around the mandrel over the clamp.

In order that the clamp may have some play to coact with stock of different thicknesses, the roller 51 is slightly loose in the groove of cam 52, the roller being maintained in contact with one side of the groove by means of a coiled spring 16 surrounding the shaft 24 and pressing at one end against a shoulder on a collar 17 fitted on the sleeve 46 and bearing at its other end against a brake-drum 18 keyed to shaft 24, the brake-element 19 designed to bear against the periphery of the drum 18 being actuated by a cam 20 (Figure 1) on shaft 53, so that the shaft 24 will always be stopped during the cessation of its rotation with the mandrel in a definite predetermined position.

There are three stations on the mandrel, A, B, and C. At the first station A the strip of stock is wound around the mandrel convolutely to form the container or receptacle body. At the second station the free or trailing end of the stock is rolled down on to the remainder thereof already wound on the mandrel, and a window is provided in the body thus formed at such second station. At the third station C a windowed label is wrapped around the body with the two windows in proper register, the window of the label having been previously covered with a suitable transparent material.

Referring now to the mechanism operative at the first station A on the mandrel, which is that portion thereof equipped with the oscillatory clamp or gripper, reference should be had to Figures 2 and 3.

A cam 61 on shaft 53 oscillates a rock-arm 62 fulcrumed on the frame at 63 and connected by a curved link 64 to a companion rock-arm 65 mounted for oscillation on the frame at 66, the upper or free end of arm 65 being operatively connected by a link 67 adjustable as to length with a slide 68 reciprocating transversely of the mandrel 36 and guided in its movements by appropriate ways.

The upper portion of such slide has a stock-feeding dog 69 on an oscillatory shaft 71 weighted at 72.

A continuous strip or ribbon of stock 73, such as pasteboard or the like, adhesive coated on its top surface, extends up over a suitably-mounted roller 74 between a pair of adjustable side-guides 75, 75, and the strip extends forwardly toward the mandrel between a support 76 and an upper plate 77.

When the slide retracts, the dog 69 readily rides freely over the top adhesive-faced surface of the strip 73, and, when the slide travels toward the mandrel, the dog engages the strip 73 and feeds it forwardly between the members 76 and 77, so that its front edge is advanced under the clamp 37 which then rocks down automatically to grip it firmly to the then stationary mandrel.

As the mandrel thereupon revolves with the advance end of the strip thus secured to it, the strip is wound around the mandrel convolutely so that the several layers become adhered together, but, of course, it is necessary to sever the strip 73 into proper lengths for the individual convolute bodies to be produced therefrom, and, accordingly, the appliance includes, as shown in Figures 3 and 7, a stationary knife-blade 78 above the strip and a rocking knife-blade 79 below it, the blade 79 being mounted on a lever 80 fulcrumed at 81 with a pin 82 (Figures 2 and 7) in depending spaced portions of the arm, such pin extending through a slot 83 in an upright section of a bar 84 reciprocating through a guide 85 and slid back and forth by means of an arm 87 connected to one end of the bar, such arm being rigid with another, suitably-guided, reciprocating member 86 carrying a roller 88 located in the groove of a cam 89 on shaft 53.

At the proper time, the blade 79 swings up and cuts off the required length of strip from the stock supply.

It is now necessary to slide this partially-formed, convolute body to the second station B on the mandrel, and to perform this function the following specified instrumentalities have been provided:

Referring more particularly to Figures 2, 3, and 6, it will be noted that a collar 91 having a central, rectangular aperture through which the mandrel 36 extends has a groove on its round periphery accommodating the shift-fork 92 of an arm 93 forming part of a carriage 94 slidable lengthwise the structure between guides 95, 95, the reciprocatory movements of this carriage being effected through a link 96 (Figures 1 and 2) pivoted to the carriage and to the upper end of a rock-arm 97 hinged on the frame at 98 and supplied with a roller 99 in a groove of cam 101 on shaft 53.

At the correct time the sliding of the member 91 along the mandrel pushes the convolutely-wound body from the first station A to the second station B and at the same time through an intervening, partially-finished receptacle-body shifts the one at the second station B to an intermediate position D and the one at such interjacent position D to the third station C, and also simultaneously pushes the finished body at the third station C to a final position E and discharges the one at position E off of the end of the mandrel.

The mechanism in register with such second station B is indicated perhaps more clearly in Figures 2 and 5.

The rear end of the wound body strip was not fully forced down into adhering relation with the underlying convolutions on the mandrel, and this finishing operation is completed at the second station by means of a roller 110 mounted on a support 111 on the upper portion of a rock-arm 112 hinged on the frame at 113 and having a roller 114 cooperating with a cam 115 on shaft 53 and against the periphery of which the roller is maintained yieldingly in contact by an adjustable, coiled spring 116 connected to the arm and to the machine frame.

While the mandrel is revolving, the roller 110 approaches it and rolls down the terminal portion of the strip into cementing relation with the underlying convolutions and then the roller recedes, all of which is, of course, accomplished by the action of cam 115.

Also, at this second station the window is provided in one side of the convolutely-wound receptacle-body.

To this end the machine includes a transversely-reciprocating slide 117 traveling between guides 118, the member 117 being worked by means of a link 119 connecting it to one end of a lever 121 fulcrumed on the machine-frame at 122, the lower end of such lever having a roller 123 riding on the edge of a cam 124 on a shaft 125 revolubly mounted in suitable bearings on the frame, such shaft 125 being rotated by means of a sprocket-chain 126 passing around a sprocket-wheel 127 on shaft 53, another sprocket-wheel 128 on shaft 125 and a third sprocket-wheel 129 on another shaft 131 supported in bearings on the frame.

Slide 117 has an electric motor 132 mounted on it which by intermeshing gears 133 and 134 revolves a sleeve 135 revoluble in a bearing 136 in the upper portion of a post 137 rising from the slide, that end of sleeve 135 toward the mandrel having a tubular cutter or saw 138 in register with a cavity 139 in the mandrel.

A stripper 140, located inside of the circular cutter 138, is mounted on a shaft, or stem 141 extended through the sleeve and it is slidingly supported in an upright 142 mounted on the frame, a coiled spring 143 being interposed between a stop collar 144 on the rod 141 and the hub of gear 134.

While the mandrel is stationary with its recessed side toward, and the cavity in register with, the cutter, cam 124 advances the slide and its rapidly revolving cutter toward the immovable convolute body on the mandrel, and, as it does so, the stripper 140 carried along with it recedes into the cavity in the cutter due to the action of spring 143 pressing on the collar 144.

The revolving cutter or saw provides a circular window in the side of the receptacle-body and then retreats, but when the collar 144 strikes the support 142, the stripper remains stationary although the cutter continues its recession, with the result that the disc removed from the receptacle-wall is ejected or discharged from the cutter.

During the next period of non-rotation of the mandrel, the windowed body at station B is pushed along the mandrel by the partially-completed body oncoming from station A to station B to the intermediate position D indicated in dotted lines in Figure 2, and in traveling to such position D it pushes the finished body at station C ahead of it to a still further advanced place E on the mandrel, and the next time that such intermediate body is fed forwardly it will come to station C, and, in register with such station, the machine is provided with the following described mechanisms shown in detail in Figures 1, 2, 5, 8, and 9.

The strip from a continuous stock roll of printed labels 151 passes between a pair of feed-rollers 152, 153 automatically actuated intermittently by means of intermeshing gears 154 and 155 on the shafts of the two rollers, a gear 156 on the shaft of the lower roller in mesh with a larger gear 157 fixed to a suitably-bearinged shaft 158 to which is also fastened a ratchet-wheel 159 supplied with a lock-pawl 161 and with a spring-pulled, actuating-pawl 162 rockingly mounted on an arm 163 oscillatory on the shaft 153 and connected by a link 164 to a rock-arm 165 fulcrumed on the machine-frame at 167 and equipped with a roller 166 cooperating with a cam 168 on shaft 53.

Of course, it is necessary to sever the individual labels in succession from the stock strip, and for this purpose the mechanism is provided with an upper, stationary knife-blade 171 (Figure 8), beneath which the label strip passes, and an oscillatory companion knife-blade 172 hinged at 173 and having a depending arm 174 fitted with a pin 175 located in the upper, forked end of a lever 176 fulcrumed on the machine frame at 177 and supplied with a roller 178 coacting with a cam 179 on shaft 131.

The label is fed forwardly between stationary, spaced plates 181, 182, the former of which is provided with an upright bearing accommodating a reciprocatory punch 183 and the lower one of which is supplied with an opening forming a die for the punch and providing for the discharge of the portion of the label punched out therefrom to make the window.

Punch 183, as shown in Figure 8, is slid up and down in its bearing by a lever 184 fulcrumed at 185, one end of the lever having a sufficiently-loose connection with the punch and the other end of the lever having a slightly-free connection with a vertically-reciprocatory bar 186 sliding in a stationary bearing 187 and normally pulled downwardly by a coiled contractile spring 188, the bar being pushed upwardly at the proper time by means of a roller 189 traveling on the periphery of a cam 191 on shaft 131.

The label is advanced by two pairs of feed-rollers 192, 193, and 194, 195, the lower ones of which are actuated, as shown in Figure 9, by a sprocket-chain 200 cooperating with sprocket-wheels 196, 197 on the shafts of such under rollers, one of such shafts being supplied with a gear 198 meshing with another gear 199 intermittently rotated by cooperation with a gear-sector 201 on shaft 53.

In order that the top surface of the downwardly-facing label may be supplied with adhesive only around the margin of its window, an adhesive-applying roller 202 with a properly-shaped, raised, coating surface is supplied with glue or other cementitious material from a fountain 203 by suitable rollers 204 and 205, roller 202 being intermittently revolved by a gear 206 on the shaft of the roller in mesh with a gear 207 which in turn coacts with another gear 208 turned at intervals by a gear-segment 209 on shaft 53.

A strip 210 of transparent material, such as cellophane, is fed forwardly from a supply-roll 211 by a pair of feed-rollers 212, 213 actuated interruptedly by a cam 214 on shaft 131 through a rod 215 and suitable gear, ratchet and pawl mechanism substantially like that employed for operating the rollers 152 and 153.

The advancing, transparent strip is cut into lengths by a stationary knife-blade 221 with which cooperates a movable knife-blade 222 actuated by an arm 223 having a roller 224 coacting with a cam 225 (see Figures 5 and 8).

The severed, transparent window-cover slides down an inclined chute 226 and at the proper time is pushed down on to the top surface of the label in register with its window to become adhered to the label by a rock-arm 227 actuated by a rod 228 cooperating with a cam 229 on shaft 53.

The forward end of the windowed label contacts with a stop 231 to correctly position it and at the proper time such end is pushed up into adhering relation with the adhesive-coated, convolute body on mandrel 36 by a pusher 232 actuated by a cam 233.

This initial securing of the front end of the label to the body on the mandrel is effected while the latter is stationary, and during the subsequent rotation of the mandrel the label is wrapped around the windowed body so as to become adhered thereto and with the transparent, covered window of the label in proper register with the window of the receptacle-body.

In order to roll the label down on to such body during its rotation, a roller 241 is mounted on a rock-arm 242 fulcrumed at 243 on the top end of an upright, swinging arm 244 fulcrumed on the frame at 245 and rocked back and forth by a cam 246 coacting with a roller 247 on an arm 248 secured to the fulcrum-shaft 245 on which the member 244 is keyed.

A spring-actuated plunger 249 presses up against the under surface of the lever 242 on one side of its fulcrum, and one end of the lever is pulled down by a spring 251 connected thereto and to an extension 252 on the part 244.

After the advance end of the label has been stuck to the body on the mandrel by the member 232, the latter recedes and the roller 241 comes in under the mandrel out of contact with the label, so as not to rub it off, and then approaches the mandrel to roll down the label into secure adhering relation with the body on the mandrel during the rotation of the latter.

This action is brought about by the rocking of arm 244 and the rocking of lever 242 on its fulcrum 243, the latter operation being effected by a slide 253 fitted with a roller 254 pressing against the underside of lever 242, the slide being reciprocated in a suitable guideway by a lever 255 fulcrumed at 256 and connected to the slide at 257 and equipped at its opposite end with a roller 258 coacting with a cam 259.

In order to steady and support the free or discharge end of the mandrel during the various operations of winding the body thereon, cutting out the window and applying the windowed label to the body, the mechanism has an arm 261 (Figure 2) equipped with a tapered end or roller 262 adapted to fit in a correspondingly-shaped, axial recess in the end of the mandrel, arm 261 being mounted on the top end of an upright shaft 263, oscillatory in suitable bearings and having another arm 264 connected by a link 265 to a bell-crank lever 266 fulcrumed at 267, one arm of such lever having a roller 268 located in the groove of a cam 269 on the shaft 125.

The construction is such that the arm 269 supports and steadies the free end of the mandrel at all times, except when the finished, labeled body is being pushed off of the mandrel at which time the arm recedes temporarily or momentarily out of the way but immediately moves back into operative, mandrel-supporting position.

From the foregoing, it will be apparent that the advance end of the body-stock strip is gripped or clamped to the mandrel at the first station while the mandrel or form-bar is temporarily stationary and is convolutely wound around the mandrel during the next turning action thereof.

This partially-completed, externally-adhesively-coated, convolutely-wound body is then pushed along the mandrel to the second station while the mandrel is stationary, and then during the next period of rotation of the outer or trailing end of the body-strip is rolled down into place, and during the next stationary interval the window is cut out.

When the windowed body reaches the third station, the covered-window label is wrapped around the body with the two windows in register, and ultimately the finished body is delivered off of the end of the mandrel.

Figure 12:
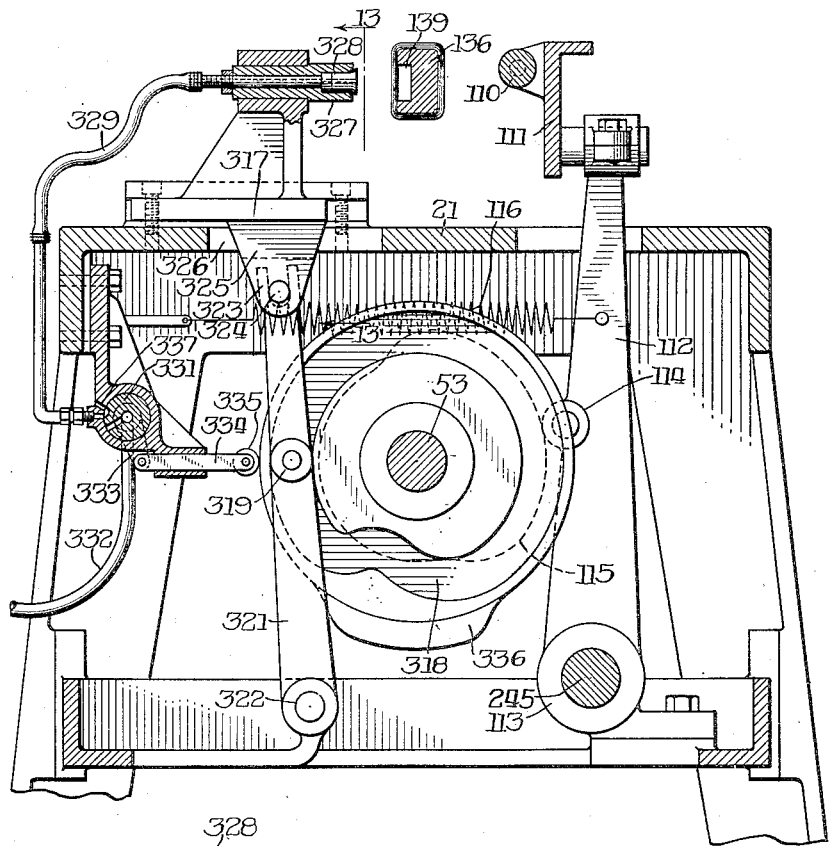
Figure 12 is a vertical cross-section showing a modified means for producing the window in the receptacle body.
Figure 13:
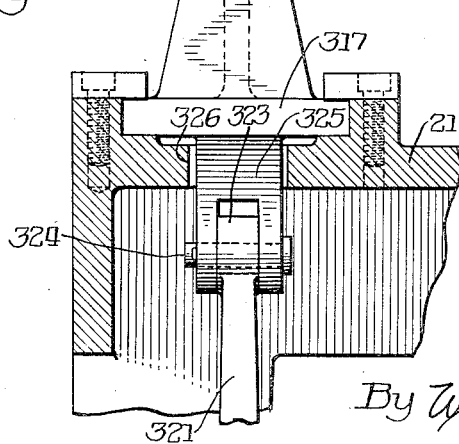
Figure 13 is a cross-section on line 13—13 of Figure 12.

In some cases it may be desirable to punch out the window in the convolute body rather than to cut it out by the mechanism already described and a substitute appliance to work along that line has been shown in Figures 12 and 13.

In such case, instead of using the slide 117, a transversely-reciprocating slide 317 is operated by a cam 318 on shaft 53 coacting with a roller 319 on an arm 321 rockingly mounted on the frame at 322 and provided at its top end with a fork 323 engaging a pin 324 on an extension 325 projecting downwardly through the table top from the slide 317 through an opening 326.

Figure 14:
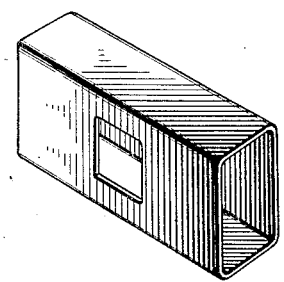
Figure 14 is a perspective view of the form of container produced by the mechanism shown in Figures 12 and 13.

The slide carries a hollow punch 327 coacting with the mandrel cavity 139 to cut out the window, which may be of any desired shape, but, in this particular instance, is rectangular or square, as shown in Figure 14.

The punch 327 has a suction-cup 328 inside of it connected by piping 329 to a valve 331 joined to a source of suction through a hose or conduit 332, the valve arm 333 being operated by a suitably-guided, reciprocatory bar 334 supplied with a roller 335 coacting with a cam 336 on shaft 53.

When the punch cuts out the window in the side of the convolute body, the suction in the suction-cup holds the cut-out piece to the punch during its recession, and at the proper moment the valve is actuated to admit outer air through an opening 337 to effect the discharge or release of the cut-out piece.

Those acquainted with this art will understand that the invention is not limited and restricted to the precise and exact details of structure shown and described, and that these may be modified within substantial limits without departure from the essence of the invention as defined by the appended claims.

I claim:

1. In a machine for making windowed convolutely-wound container-bodies, the combination of a mandrel, means to revolve said mandrel intermittently about its axis, means at a first station on said mandrel to clamp the forward ends of successively-advanced adhesive-coated body-blanks to said mandrel, whereby said blanks will be convolutely wound around the mandrel in succession during subsequent rotations of the latter, means to feed said blanks in succession to said mandrel and clamping means, means to initiate such clamping action while the mandrel is stationary and to terminate the clamping operation when each blank has been wound, means to force the outer end portion of each such blank into adhering relation to the wound remainder of the blank at a second station on, and during the rotation of, the mandrel, means to remove a portion of each convolutely-wound body at said second station on said mandrel while the latter is stationary to provide a window in the body wall, means to feed labels in succession to such wound bodies at a third station on said mandrel, means to wrap each label around its corresponding body at such third station on, and during rotation of, the mandrel, each such label having a window covered with a transparent material which when wound on said body registers with said body window, and a feeder to slide said wound bodies progressively from said first station to said second and third stations and finally to discharge the labelled containers from the mandrel.

2. In a machine for making windowed convolutely-wound container-bodies, the combination of a mandrel, means to revolve said mandrel intermittently about its axis, means at a first station on said mandrel to clamp the forward ends of successively-advanced adhesive-coated body-blanks to said mandrel, whereby said blanks will be convolutely wound around the mandrel in succession during subsequent rotations of the latter, means to feed said blanks in succession to said mandrel and clamping means, means to initiate such clamping action while the mandrel is stationary and to terminate the clamping operation when each blank has been wound, means to force the outer end portion of each such blank into adhering relation to the wound remainder of the blank at a second station on, and during the rotation of, the mandrel, means to remove a portion of each convolutely-wound body at said second station on said mandrel while the latter is stationary to provide a window in the body wall, means to feed labels in succession to such wound bodies at a third station on said mandrel, means to wrap each label around its corresponding body at such third station on, and during rotation of, the mandrel, each such label having a window covered with a transparent material which when wound on said body registers with said body window, a feeder to slide said wound bodies progressively from said first station to said second and third stations and finally to discharge the labelled containers from the mandrel, means to support the discharge end of said mandrel during the stock-winding, window-providing and label-wrapping operations, and means to move said mandrel supporting means intermittently temporarily away from said mandrel to permit delivery of the labelled bodies from such mandrel end.

3. In a machine for making windowed convolutely-wound container-bodies, the combination of a mandrel, means to revolve said mandrel intermittently about its axis, means at a first station on said mandrel to clamp the forward ends of successively-advanced adhesive-coated body-blanks to said mandrel, whereby said blanks will be wound convolutely around the mandrel in succession during subsequent rotations of the latter, means to feed said body blanks in succession to said mandrel and clamping means, means to initiate such clamping action while the mandrel is stationary and to terminate the clamping operation when each blank has been wound, means to force the outer end portions of each such blanks into adhering relation to the wound remainder of the blank at a second station on, and during the rotation of, the mandrel, means to remove a portion of each such convolutely-wound body at said second station on said mandrel while the latter is stationary to provide a window in the body-wall, means to support a continuous supply-roll of labels, means to feed said strip of labels toward the mandrel, means to cut out windows in said labels, means to cover said label windows with transparent material, means to sever said label strip into individual labels, means to wrap each such windowed label around its corresponding wound body on said mandrel at a third station on, and during rotation of, the mandrel, each such label having its covered window in register with the body window, and a feeder to slide said wound body progressively from said first station to said second and third stations and finally to discharge the labelled window containers from the mandrel.

4. In a machine for making windowed convolutely-wound container-bodies, the combination of a mandrel, means to revolve said mandrel intermittently about its axis, means to wind an adhesive-coated body-blank convolutely around said mandrel, means to remove a portion of such convolutely-wound body on the mandrel while the latter is stationary to provide a window in the body wall, means to wrap a label around said windowed body, said label having a window covered with transparent material which when wound on said body registers with the body window, and means to discharge the labelled body from the mandrel.

In witness whereof I have hereunto set my hand.

ROBERT H. FLUEGGE.